US012475115B2

(12) United States Patent
Zhao et al.

(10) Patent No.: US 12,475,115 B2
(45) Date of Patent: Nov. 18, 2025

(54) IoT SECURITY KNOWLEDGE-BASED CHATBOT SYSTEM

(71) Applicant: Palo Alto Networks, Inc., Santa Clara, CA (US)

(72) Inventors: Yilin Zhao, Sunnyvale, CA (US); Ke Tian, San Jose, CA (US); Dylan Stewart Spagnuolo, Santa Clara, CA (US); Mei Wang, Saratoga, CA (US); Kanimozhi Kalaichelvan, San Jose, CA (US); Yelman Ur Rehman Khan, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 34 days.

(21) Appl. No.: 18/459,138

(22) Filed: Aug. 31, 2023

(65) Prior Publication Data

US 2025/0077511 A1 Mar. 6, 2025

(51) Int. Cl.
*G06F 16/2452* (2019.01)
*G06F 16/25* (2019.01)
*G06N 3/0455* (2023.01)

(52) U.S. Cl.
CPC ...... *G06F 16/24522* (2019.01); *G06F 16/252* (2019.01); *G06N 3/0455* (2023.01)

(58) Field of Classification Search
CPC ............ G06F 16/24522; G06F 16/252; G06N 3/0455
See application file for complete search history.

(56) References Cited

U.S. PATENT DOCUMENTS

| 10,757,044 B2 | 8/2020 | Fawcett | |
| 2019/0104157 A1* | 4/2019 | Filar | G06F 40/30 |
| 2020/0351295 A1* | 11/2020 | Nhlabatsi | H04L 63/205 |
| 2023/0185799 A1* | 6/2023 | Hoang | G06N 20/00 |
| | | | 704/2 |

(Continued)

OTHER PUBLICATIONS

Lempinen, Chatbot for Assessing System Seurity With OpenAI GPT-3.5, pp. 1-34, Jun. 30 (Year: 2023).*

(Continued)

*Primary Examiner* — Albert M Phillips, III
(74) *Attorney, Agent, or Firm* — Gilliam IP PLLC

(57) ABSTRACT

A stateful chatbot system leverages generative AI to provide an interface by which users can retrieve information from backend IoT databases of a security provider via natural language queries. Upon receiving a natural language query that corresponds to a request for information from the database, the chatbot generates a corresponding database query having a format compatible with the database. The chatbot comprises a generative model adapted to generate database queries based on natural language queries via prompt engineering using natural language and database query pairs. The chatbot queries the database with the generated database query, retrieves results comprising data/metadata that satisfy the query, and generates a summary of the results, both of which it presents as a response to the user's query. The chatbot also has access to a vulnerability database from which it can obtain information about known vulnerabilities documented therein to respond to user queries.

20 Claims, 5 Drawing Sheets

(56) References Cited

U.S. PATENT DOCUMENTS

| | | | | |
|---|---|---|---|---|
| 2023/0267227 | A1* | 8/2023 | Ghatage | G06F 21/31 726/26 |
| 2024/0045893 | A1* | 2/2024 | Reddy | G06F 16/90332 |
| 2024/0061835 | A1* | 2/2024 | Subramanian | G06F 16/252 |
| 2024/0362212 | A1* | 10/2024 | Sun | G06F 16/24522 |

OTHER PUBLICATIONS

Bunardzic, How to build a stateful bot, pp. 1-8 (Year: 2016).*
White, A Prompt Pattern Catalog to Enhance Prompt Engineering with ChatGPT, pp. 1-19, Feb (Year: 2023).*
Dale, Handbook of Natural Language Processing, pp. 215-248 and 906-922 (Year: 2000).*

* cited by examiner

IoT SECURITY KNOWLEDGE-BASED CHATBOT SYSTEM

BACKGROUND

The disclosure generally relates to data processing (e.g., CPC subclass G06F) and to computing arrangements based on specific computational models (e.g., CPC subclass G06N).

Chatbots are commonly employed to provide automated assistance to users by simulating human conversation via chat-based interactions. Example use cases for chatbots include handling customer inquiries, automating tasks, providing information, and delivering recommendations. Chatbots are increasingly implemented using artificial intelligence (AI) to handle and respond to natural language inputs from users, with implementations rapidly adopting generative AI for text generation.

A multitude of generative AI technologies are built upon transformer models. The "Transformer" architecture was introduced in VASWANI, et al. "Attention is all you need" presented in Proceedings of the 31st International Conference on Neural Information Processing Systems on December 2017, pages 6000-6010. The Transformer is a first sequence transduction model that relies on attention and eschews recurrent and convolutional layers. The Transformer architecture has been referred to as a foundational model and there has been subsequent research in similar Transformer-based sequence modeling. Architecture of a Transformer model typically is a neural network with transformer blocks/layers, which include self-attention layers, feed-forward layers, and normalization layers. The Transformer model learns context and meaning by tracking relationships in sequential data. Some large scale language models ("LLMs") are based on the Transformer architecture.

With Transformer-based LLMs, the meaning of model training has expanded to encompass pre-training and fine-tuning. In pre-training, the LLM is trained on a large training dataset for the general task of generating an output sequence based on predicting a next sequence of tokens. In fine-tuning, various techniques are used to fine-tune the training of the pre-trained LLM to a particular task. For instance, a training dataset of examples that pair prompts and responses/predictions are input into a pre-trained LLM to fine-tune it. Prompt-tuning and prompt engineering of LLMs have also been introduced as lightweight alternatives to fine-tuning. Prompt engineering can be leveraged when a smaller dataset is available for tailoring an LLM to a particular task (e.g., via few-shot prompting) or when limited computing resources are available. In prompt engineering, additional context may be fed to the LLM in prompts that guide the LLM as to the desired outputs for the task without retraining the entire LLM.

BRIEF DESCRIPTION OF THE DRAWINGS

Embodiments of the disclosure may be better understood by referencing the accompanying drawings.

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Overview

To retrieve security information about a tenant's Internet of Things (IoT) devices, a user associated with the tenant typically navigates a dashboard system manually via a user interface or directly interfaces with databases that store IoT security information. This can be cumbersome since users may lack familiarity with the dashboard format or database query language and thus may be unable to retrieve the desired information in an efficient manner. To simplify the user experience in navigating security information about IoT devices, a stateful chatbot system disclosed herein interfaces with backend IoT databases of the security provider that store the obtained tenant data and leverages generative AI to process and respond to natural language queries submitted by users. IoT information can include data/metadata of IoT devices deployed across tenants, vulnerabilities known to impact IoT devices, and alerts generated for IoT devices, among other examples.

The chatbot system provides users with an intuitive interface for a database(s) in which IoT security information managed by the security provider is stored. Upon receipt of a query formed with natural language that is determined to correspond to a request for information from the database, the chatbot system generates a database query representative thereof that has a format compatible with the database. To do so, the chatbot system utilizes a generative model (e.g., a pre-trained transformer-based LLM) that has been adapted to generate database queries based on natural language queries indicated in prompts (e.g., as a result of prompt engineering) using inputs comprising natural language queries as prompts and corresponding database queries as expected responses. The chatbot system queries the database with the generated database query and, upon retrieval of results comprising IoT device data/metadata that satisfy the query, leverages an additional generative model to generate a summary of the results in natural language. The chatbot system presents the results and the summary to the user as a response to the provided query. The chatbot system also has access to a vulnerability database(s) from which it can obtain information about known vulnerabilities documented therein that it identifies in user queries, thus providing tenants with a robust system for retrieving information about their IoT device security across a variety of knowledge sources from a single interface via natural language interactions.

Example Illustrations

Figure 1:
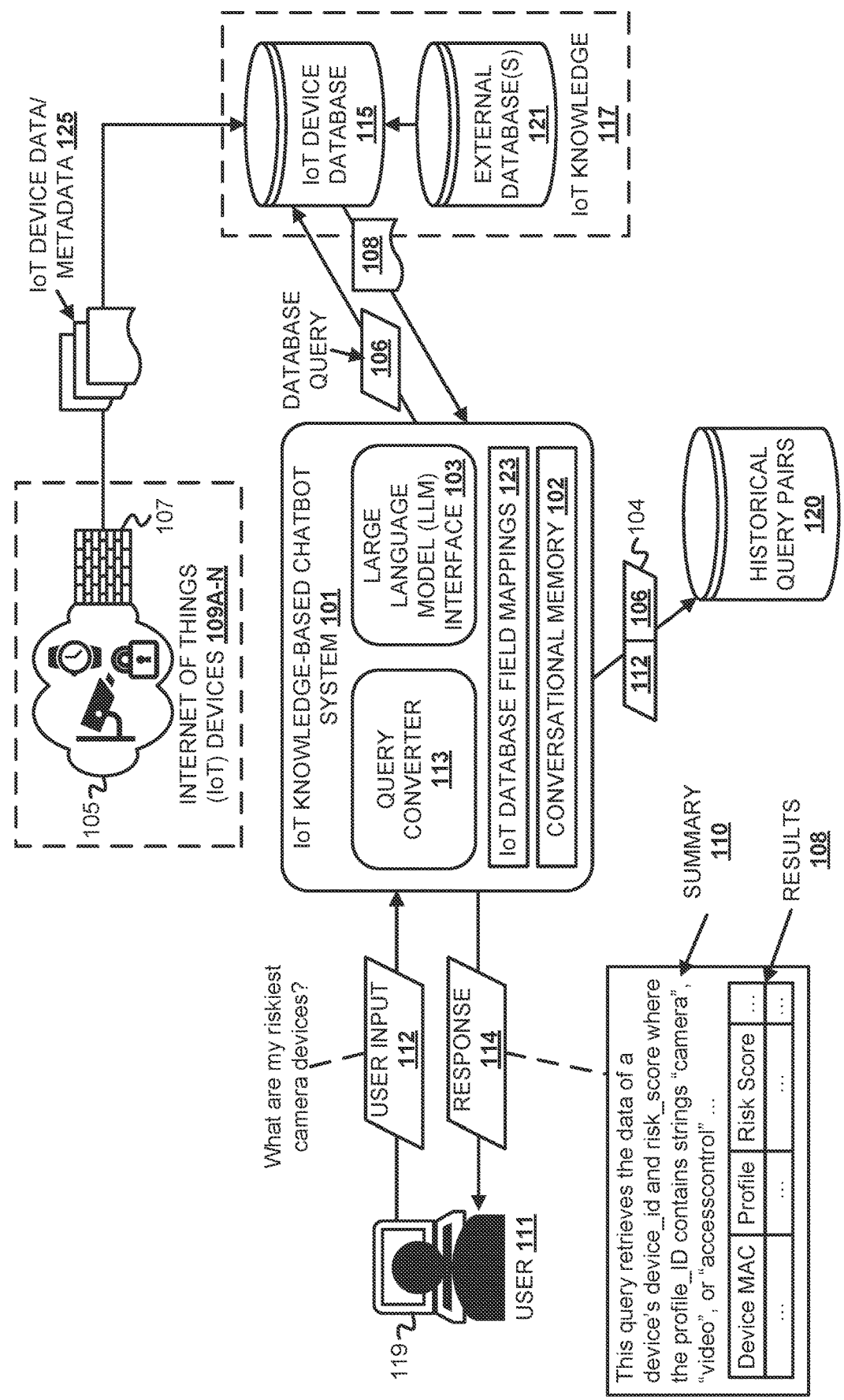
FIG. 1 is a conceptual diagram of a chatbot system that processes and responds to natural language queries pertaining to IoT security.

FIG. 1 is a conceptual diagram of a chatbot system that processes and responds to natural language queries pertaining to IoT security. A tenant's network 105 is secured by a firewall 107. The "tenant" refers to a customer of a security provider that has provided the firewall 107 available to the customer. Each of a plurality of IoT devices 109A-N is connected to the Internet via the network 105 and secured via the firewall 107. The IoT devices 109A-N depicted in this example include a security camera, a lock, and a watch.

While the IoT devices 109A-N are depicted as connected to one network that is secured by one firewall for simplicity, the network to which the IoT devices 109A-N are connected can encompass multiple sites and/or can be secured by multiple firewalls. The firewall 107 discerns data/metadata of the IoT devices 109A-N (e.g., via network traffic and/or obtained configuration data), depicted as IoT device data/metadata 125 in FIG. 1, and stores the information in an IoT device database ("database") 115. The database 115 can maintain information about IoT devices of the tenant or can maintain information about IoT devices across tenants. In the case of the latter, the database 115 may be indexed by tenant identifier. The database 115 may also maintain other data/metadata of the IoT devices 109A-N stored therein by various services of the security provider, such as information about alerts generated for any of the devices, vulnerabilities identified for any of the devices, and other security-related information about the devices.

FIG. 1 also depicts an IoT knowledge-based chatbot system ("chatbot") 101 that interacts with a user 111 of an endpoint device 119. This example assumes that the user 111 corresponds to the tenant associated with the network 105 and IoT devices 109A-N. The chatbot 101 responds to queries input by the user 111 via the endpoint device 119 with information obtained from a base of IoT knowledge 117. The IoT knowledge 117 encompasses one or more databases that in this example include the database 115 and at least a first external database 121 that exposes an application programming interface (API) that is accessible by the chatbot 101. The external database 121 can comprise a vulnerability database, such as the National Vulnerability Database (NVD), for example. The chatbot 101 includes a query converter 113 and an LLM interface 103. The query converter 113 converts natural language queries input by users to database queries (e.g., SQL queries) that can be submitted to a database(s) encompassed by the IoT knowledge 117 via a generative model. The LLM interface 103 provides an interface to an LLM, which may be a pre-trained LLM, such as a pre-trained transformer-based LLM. The query converter 113 and/or LLM interface 103 can be implemented based on an off-the-shelf and/or open-source LLM integration framework, such as the LangChain® framework. For instance, the query converter 113 and/or LLM interface 103 may be implemented at least partly based on LangChain toolkits.

Turning to the flow of operations triggered by interaction of the user 111 with the chatbot 101, upon input by the user 111 of a query comprising natural language ("user input 112"), the chatbot 101 obtains the user input 112 and generates a database query 106 representative thereof. In FIG. 1, the user input 112 comprises the question, "What are my riskiest camera devices?", which is a natural language query by the user 111 for those of the IoT devices 109A-N associated with the greatest risk. The security provider has previously assessed risk of the IoT devices 109A-N and stored indications of their risk (e.g., risk scores) in the database 115. To "translate" the natural language of the user input 112 into a format that is compatible with and can be submitted to the database 115, the query converter 113 generates a database query representative of the user input 112. The query converter 113 provides the user input 112 as input to a generative model (e.g., a pre-trained transformer-based LLM) that has been refined to generate database queries based on natural language queries provided as input. Refinement of the generative model used for converting natural language to database queries may be based on prompt engineering, prompt-tuning, or fine-tuning. Techniques used for refining the generative model can vary among generative models leveraged by the chatbot 101 for query conversion. The query converter 113 may interface with the generative model via an API of the model via which it provides the user input 112. The query converter 113 generates the database query 106 through use of the generative model. The database query 106 may be a SQL query that searches the database 115 for the IoT devices documented therein that are indicated to be a camera and have a risk score that exceeds a threshold corresponding to a higher severity of risk, for the N camera devices having the highest risk scores (e.g., based on sorting in descending order of risk score), or for a similar set of information.

The chatbot 101 queries the database 115 with the database query 106 and obtains results 108. The chatbot 101 may, for instance, comprise a database lookup tool that can submit queries to and retrieve results from the database 115. The results 108 comprise data and/or metadata of one or more of the IoT devices 109A-N that satisfy the database query 106. In this example, the results 108 should indicate a set of the IoT devices 109A-N that are camera devices and are associated with the greatest risk.

Upon retrieval of the results 108, the chatbot 101 can map database field names indicated in the results 108 with corresponding descriptive terms to be presented in the response to the user input 112. The chatbot 101 has been configured with IoT database field mappings ("mappings") 123. The mappings 123 comprise mappings of database field names of the database 115 to simplified, plain language terms that are descriptive thereof. Exemplary mappings between database fields and their corresponding plain language terms include "device ID" to "device MAC," "display_profileid" to "profile," and "ml_risk_score" to "risk score." The chatbot 101 may replace database field names identified in the results 108 with their corresponding descriptive terms identified from the mappings 123. For instance, if the results 108 comprise tabular data, the chatbot 101 may iterate over entries in the first row of the results 108 that comprise the database field names for each column, search the mappings 123 for each database field name, and replace the database field name with the term to which the name maps that is identified from the mappings 123. Subsequent depiction of the results 108 in FIG. 1 assumes that the database field names have been replaced with the corresponding terms accordingly.

To facilitate incremental prompt-tuning of the query converter 113, the chatbot 101 inserts a pair 104 comprising the user input 112 and the database query 106 into a database 120 that stores historical pairs of natural language queries received from user input and database queries generated by the chatbot 101. The pair 104 may be subject to further review based on expert knowledge before a sample is created from the pair 104 for additional refining of the query converter 113.

The chatbot 101 generates a summary 110 that comprises a textual summary of the results 108. To generate the summary, the LLM interface 103 may pass the results 108 to an LLM that is made available for conversational or chat functions. The chatbot 101 passes the results 108 and an instruction to summarize the results 108 to the LLM. Summarization of query results may be performed as a zero-shot approach (e.g., via a zero-shot LangChain agent); in other words, summarization of query results can be performed with an off-the-shelf, pre-trained LLM accessible via the LLM interface 103 without additional modification or enhancement. FIG. 1 depicts the summary 110 as detailing the data/metadata fields returned from the query for which values are included in the results 108.

The chatbot 101 provides a response 114 to the user 111 that comprises the results 108 and the summary 110. The response 114 is displayed on the endpoint device 119 as a response to the question asked by the user 111 that the chatbot 101 received as user input 112. In this example, the results 108 are included in the response 114 in tabular form as returned from the database 115. This example depicts the summary 110 as summarizing the search performed via the query that returned the results 108, both of which are indicated in the response 114.

The chatbot 101 also maintains conversational memory 102 to keep track of interactions between the user 111 and the chatbot 101. The conversational memory 102 may have been initialized with default buffer window and/or summary parameters, or these parameter values may have been set by the tenant (e.g., during initial configuration of the chatbot 101). The chatbot 101 records the user input 112 and the response 114 to the conversational memory 102 to inform subsequent interactions between the user 111 and the chatbot 101 if the conversation continues with follow-up questions by the user 111.

The following example illustrates the capabilities of the chatbot 101 for an exemplary set of database fields of the database 115. Consider a user query of, "What are the top 10 risky devices?". The following SQL query could be generated by the query converter 113:
select deviceid, tenantid, externaltenantid, display_profileid, display_profile_category, profile_vertical, display_vendor, display_model, useragent, hostname, ml_risk_score from device_chatiot where ml_risk_score is not null order by ml_risk_score desc limit 10
Exemplary results of querying the database 115 with this SQL query that are returned to the chatbot 101 are the following:

|   | deviceid | tenantid | externaltenantid\. |
|---|---|---|---|
| 0 | fc:1e:6b:36:79:10 | 24072002 | staging-banff-test |
| 1 | 01:fc:29:ea:92:b9 | 730307117181454848 | zb-research |
| 2 | 78:01:bf:42:76:08 | 730307117181454848 | zb-research |
| 3 | 02:35:9b:a0:9d:2b | 730307117181454848 | zb-research |
| 4 | fc:05:5a:bf:7c:6d | 24072002 | staging-banff-test |
| 5 | b2:2f:eb:36:6e:d9 | 24072002 | staging-banff-test |
| 6 | c9:e3:ef:d1:9f:f4 | 24072002 | staging-banff-test |
| 7 | ac:1d:3b:c6:97:80 | 24072002_auto_qa | staging-auto-fw |
| 8 | 02:07:d4:f6:32:a6 | 24072002 | staging-banff-test |
| 9 | 3801051473757406 | 1005729024939672832 | googleiotdemocust1 |

|   | display_vendor | display_model\ |
|---|---|---|
| 0 | Super Micro Computer, Inc. | None |
| 1 | F5 Networks | BAC0 Scripting Tool |
| 2 | Cisco Systems | None |
| 3 | F5 Networks | None |
| 4 | Avalue Technology | None |
| 5 | BQ | 11 |
| 6 | Advantech | test-model-0611-05 |
| 7 | Super Micro Computer, Inc. | None |
| 8 | Zebra Technologies | ZT410 |
| 9 | Reolink | None |

|   | useragent | hostname | ml_risk_score |
|---|---|---|---|
| 0 | Mozilla/5.0 (X11; Linux x86_64; rv: 91.0) Gecko . . . | hostname | 100.0 |
| 1 | Mozilla/5.0 AppleWebKit/537.36 (KHTML, like Ge . . . | hostname | 100.0 |
| 2 | Mozilla/5.0 AppleWebKit/537.36 (KHTML, like Ge . . . | hostname | 100.0 |
| 3 | Mozilla/5.0 AppleWebKit/537.36 (KHTML, like Ge . . . | hostname | 100.0 |
| 4 | Debian APT-HTTP/1.3 (1.2.26) | hostname | 100.0 |
| 5 | Mozilla/5.0 (SmartHub; SMART-TV; Linux/Raspbia . . . | hostname | 100.0 |
| 6 | Wget/1.19.4 (linux-gnu) | hostname | 100.0 |
| 7 | Mozilla/5.0 (X11; Linux x86_64; rv: 91.0) Gecko . . . | hostname | 100.0 |
| 8 | None | hostname | 100.0 |
| 9 | None | hostname | 96.0 |

The summarized output by the chatbot 101 based on these results that is provided to the user—with the formatting indicating the thought and action by the chatbot 101—is as follows:

Thought:"'json
{
"action": "Final Answer",
"action_input": "The top 10 risky devices are as follows:
1. Device ID: fc:1e:6b:36:79:10 (Super Micro Computer, IT Devices),
2. Device ID: 01:fc:29:ea:92:b9 (F5 Networks Device, Network Devices),
3. Device ID: 78:01:bf:42:76:08 (Cisco Wireless LAN Controller, Network Devices),
4. Device ID: 02:35:9b:a0:9d:2b (F5 Networks Device, Network Devices),
5. Device ID: fc:05:5a:bf:7c:6d (3D Systems Device, Office),
6. Device ID: b2:2f:eb:36:6e:d9 (Advantech B+B SmartWorx Device, Industrial),
7. Device ID: c9:e3:ef:d1:9f:f4 (3D Systems Device, Office),
8. Device ID: ac:1d:3b:c6:97:80 (PC-Linux, Traditional IT),
9. Device ID: 02:07:d4:f6:32:a6 (Zebra Label Printer, Office),
10. Device ID: 3801051473757406 (Reolink Camera, Office)."
}
"'

As can be seen from this example, the chatbot 101 is able to respond to natural language queries with natural language responses that are more easily understood by the user and can be obtained with a simple natural language query than the raw data retrieved from database querying directly.

While not depicted in FIG. 1, the database 115 can maintain IoT security information across a plurality of tenants. As an added security measure, the chatbot 101 can employ provisions to ensure that specific information about external tenants is not returned in responses to user queries. The chatbot 101 can determine as part of its initial query processing whether a query should be satisfied with cross-tenant information (e.g., general statistics) or intra-tenant information (e.g., lists of vulnerable or risky devices, device alerts, etc.). If a query can be satisfied with intra-tenant information, the chatbot 101 can append a parameter to the generated database query that the query converter 113 provides that specifies an identifier of the tenant from which the query was submitted, assuming such a parameter was not already included in the generated database query. This ensures that the results returned for presentation in the response do not include any specific information about other tenants. The chatbot 101 can address queries that specifically request information about other tenants with a response indicating that such information cannot be shared. For queries determined to be requests for general cross-tenant statistics, such as the most vulnerable type of device, the chatbot 101 may omit this safeguard.

Figure 2:
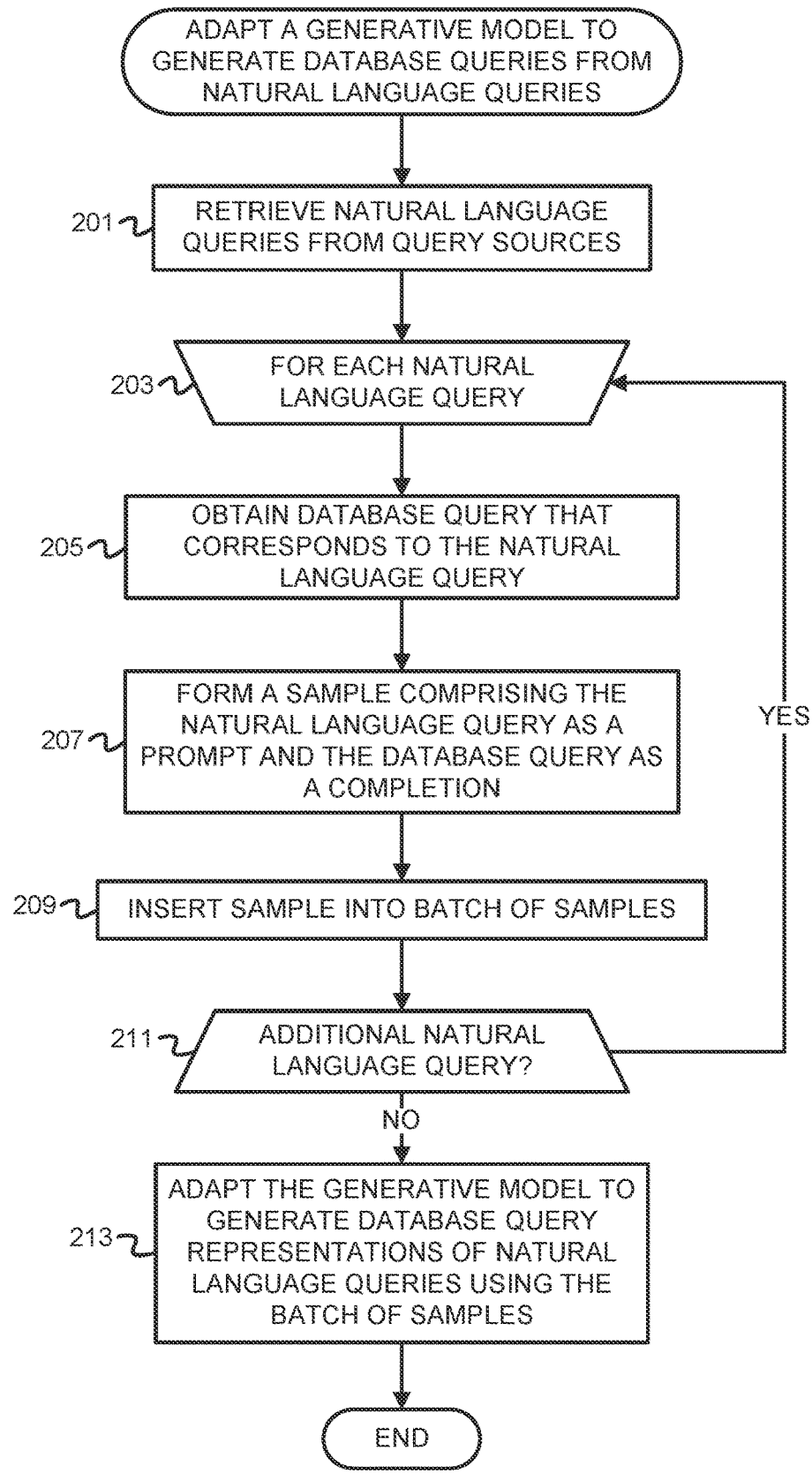
FIG. 2 is a flowchart of example operations for adapting a generative model to generate database queries from natural language queries.
Figure 3A:
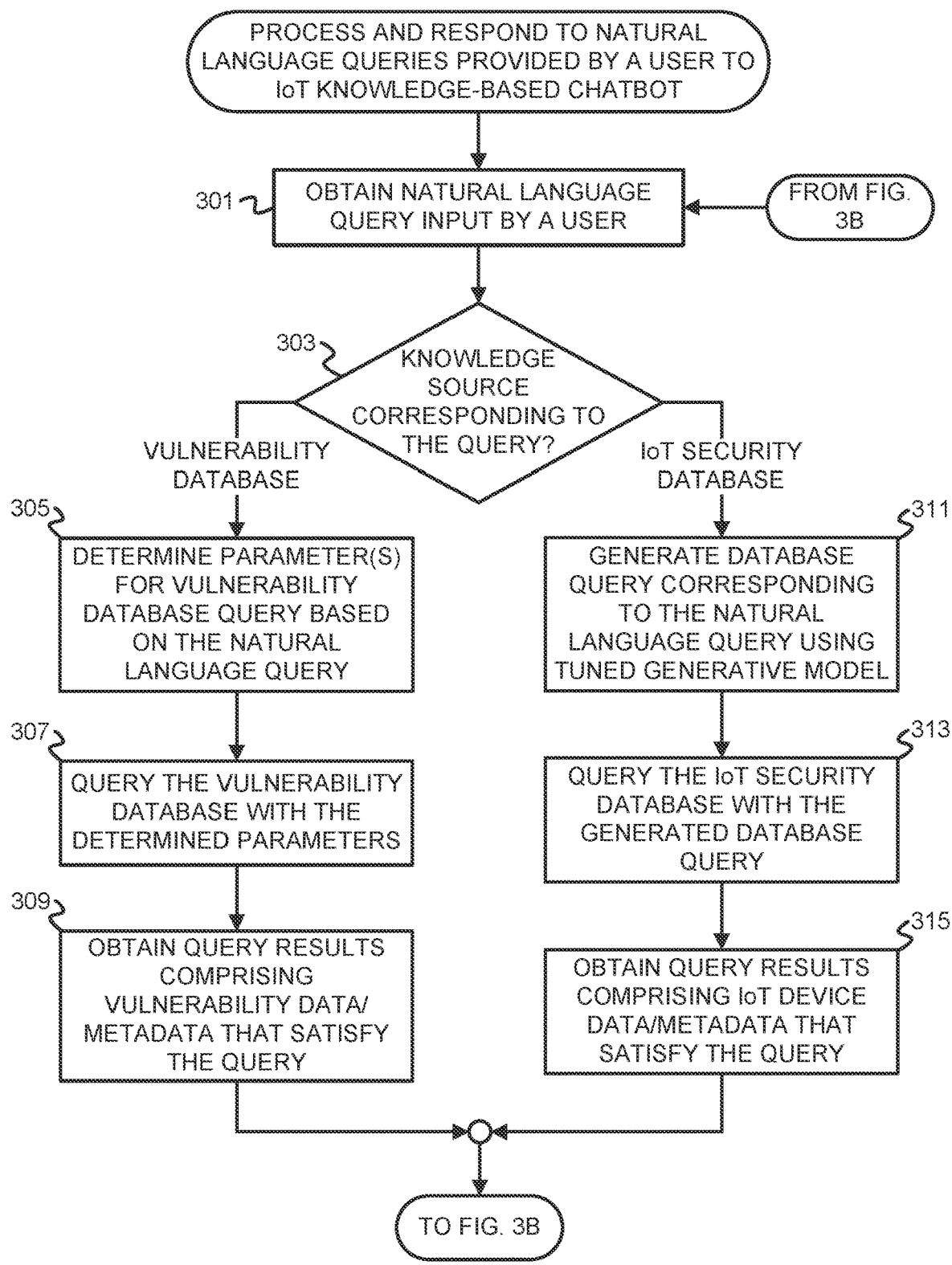
FIGS. 3A-3B are a flowchart of example operations for processing and responding to natural language queries provided by a user to an IoT knowledge-based chatbot.
Figure 3B:
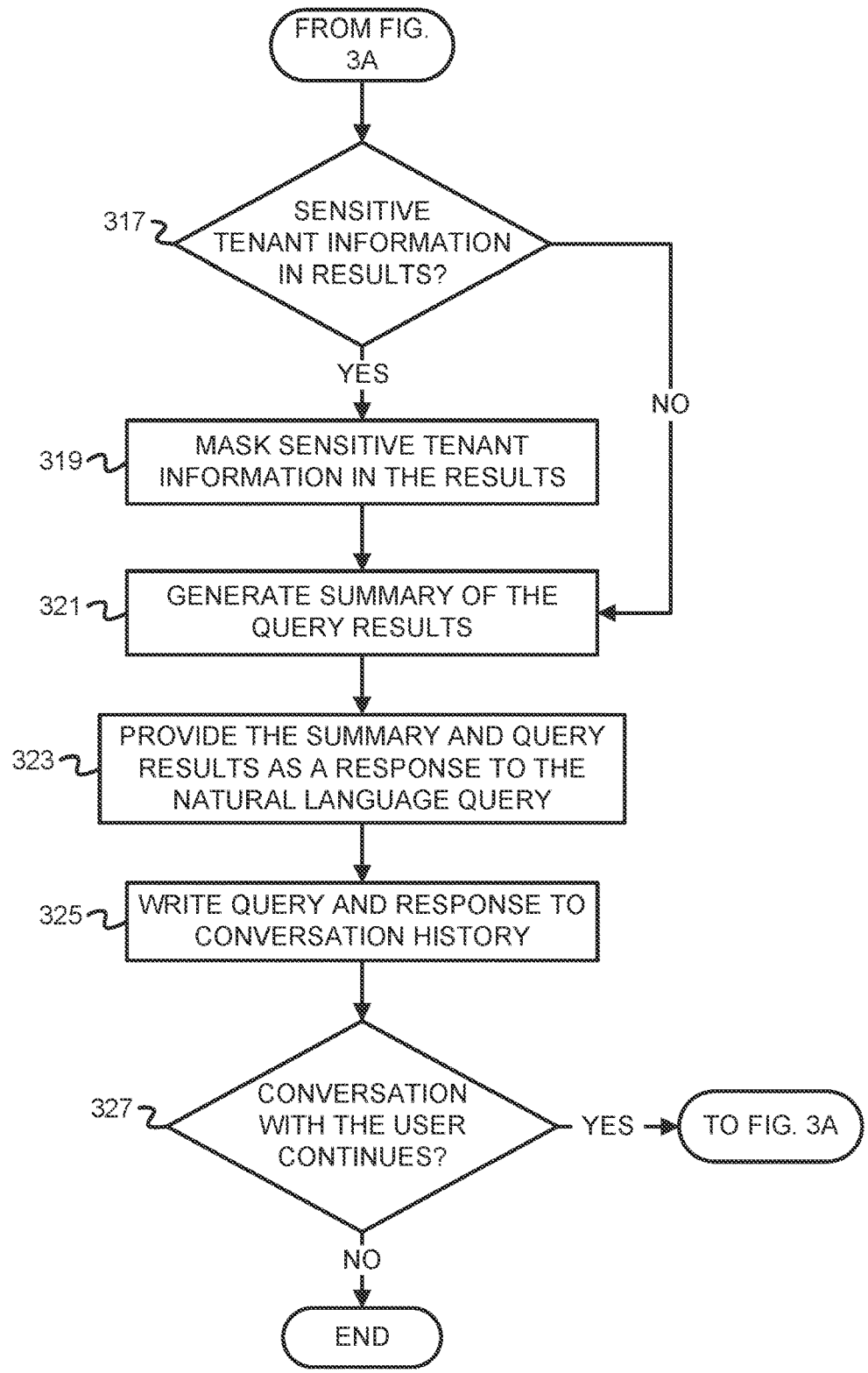

FIGS. 2 and 3A-3B are flowcharts of example operations. The example operations are described with reference to an IoT knowledge-based chatbot system (hereinafter simply "the chatbot") for consistency with FIG. 1 and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

The chatbot may be implemented at least partially with one or more libraries or other components made available by an off-the-shelf (e.g., open-source) LLM framework, such as the LangChain framework. For instance, the chatbot may comprise a LangChain agent and one or more toolkits. The toolkits used by the agent may be available off-the-shelf, may be custom built for the chatbot, or a combination thereof. As an example, an off-the-shelf toolkit may be adapted (e.g., via prompt engineering) for use by the agent via which the chatbot is implemented so that the toolkit is tailored to a corresponding task(s) of the chatbot. Example operations of the chatbot as described in the flowcharts can encompass functionality implemented by the chatbot itself (e.g., via proprietary code) and/or functionality implemented via an off-the-shelf library or other component.

FIG. 2 is a flowchart of example operations for adapting a generative model to generate database queries from natural language queries. The example operations refer to a prompt generator. The prompt generator may be incorporated in the chatbot or may be separate from the chatbot. In the latter case, the chatbot can obtain generative model inputs generated by the prompt generator for model tuning.

At block 201, the prompt generator retrieves natural language queries from one or more query sources. Query sources can include one or more databases that store natural language queries input by users and/or generated based on expert knowledge (e.g., by internal researchers), among other examples. The natural language queries should pertain to information stored in an IoT security database with which the chatbot interfaces. Exemplary topics of natural language queries include statistics about IoT devices within or across tenants, requests for statistics about alerts generated for IoT devices of a tenant, questions about IoT devices of a tenant, and questions about firewall connectivity of IoT devices of a tenant, among others.

At block 203, the prompt generator iterates through the natural language queries. At block 205, the prompt generator obtains a database query that corresponds to the natural language query. The database query is a representation of the natural language query that is compatible with a database that maintains IoT security information for one or more tenants to which the chatbot is available. As an example, the database query may be a SQL query that can be used to search the IoT security database. The database query may be provided to the prompt generator via user input or in a file in which the prompt generator identifies the database query. For instance, the database query that corresponds to the natural language query may be determined based on expert knowledge and provided to the prompt generator via user input, in a file, etc.

As another example, the prompt generator may utilize a generative model to generate the database query. The prompt generator may provide the natural language query and context information about the database, such as database schema information, database rules, database field descriptions, and information about vulnerabilities and/or alerts, as input to the generative model with an instruction to generate a database query (e.g., a SQL query) corresponding to the natural language query. The generative model can be a pre-trained transformer-based LLM that is available for conversational or chat-based tasks.

At block 207, the prompt generator forms a sample comprising the natural language query as a prompt and the database query as a completion of the prompt. The sample that the prompt generator forms at least indicates the natural language query as an input prompt and the database query as a desired output/completion of the prompt. The prompt can also include an instruction to generate a database query that represents the natural language query indicated in the prompt. The sample may further be formed to include context to guide the generative model. Context included in the sample can include database schema information, database rules, descriptions of fields of the database, and information about vulnerabilities and/or alerts, as a few examples.

At block 209, the prompt generator inserts the sample into a batch of samples. The prompt generator may insert the sample in a database that stores samples or write the sample to a file of samples for model adaptation (e.g., through prompt engineering). The sample may be subject to further review (e.g., based on expert knowledge) to verify that the database query indicated in the sample produces the correct results to sufficiently answer the natural language query when executed on the database before it is inserted into the batch that is provided for model adaptation.

At block 211, the prompt generator determines whether there is an additional natural language query to process. If there is an additional natural language query, operations continue at block 203. If not, operations continue at block 213.

At block 213, the prompt generator adapts the generative model to generate database query representations of natural language queries using the batch of samples. Refining of the generative model can be accomplished through prompt engineering using a few-shot prompting approach with the batch of samples. In other examples, the generative model can be tuned with the batch of samples through prompt-tuning or fine-tuning. The generative model that is refined can comprise a pre-trained transformer-based LLM with which the chatbot can interface (e.g., via an API of the LLM). If the prompt generator used a generative model for the initial database query generation at block 205, the prompt generator refines this generative model on the completed batch of samples. The batch of samples can comprise those of the samples generated at blocks 205-209 that have been verified to produce correct results based on a review process performed before model tuning. Once refined, the generative model is tailored to the task of generating database queries (e.g., SQL queries) representing natural language queries that are provided to the generative model.

FIGS. 3A-3B are a flowchart of example operations for processing and responding to natural language queries provided by a user to an IoT knowledge-based chatbot. The example operations assume that the chatbot can interface with a generative model that has been adapted to generate database queries based on natural language queries provided thereto (e.g., as described in reference to FIG. 2), such as via an API of a pre-trained transformer-based LLM that has been adapted for this task via prompt engineering.

At block 301, the chatbot obtains a natural language query input by a user. The natural language query is input by a user via a user interface with which the user can interface with the chatbot. Subsequent operations assume that the query is a valid query that can be handled and responded to by the chatbot. If the query is not a valid query, however, the chatbot can provide the user with a response indicating that the request could not be fulfilled, can request clarification from the user, etc.

At block 303, the chatbot determines the knowledge source corresponding to the natural language query. The chatbot interfaces with a variety of knowledge sources from which it can obtain information to satisfy user queries submitted in natural language. Examples of knowledge sources include an IoT security database that maintains IoT device and device security information for one or more tenants and a vulnerability database(s), which can include internal and/or external vulnerability databases (e.g., the NVD). The chatbot can perform preliminary processing of the natural language query to determine the corresponding knowledge source, such as by searching the text of the query for terms relating to each respective knowledge source. For instance, the chatbot can search the query for terms related to vulnerabilities and terms related to IoT security and/or devices to determine if the corresponding knowledge source is a vulnerability database or the IoT security database, respectively. If the knowledge source is a vulnerability database, operations continue at block 305. If the knowledge source is the IoT security database, operations continue at block 311.

At block 305, the chatbot determines one or more parameters for a vulnerability database query based on the natural language query. The chatbot can identify the parameter(s) from the text of the natural language query. Examples of parameters can include vulnerability identifiers and descriptive terms of vulnerabilities. The parameters determined from the text can be identified from proximal text in the natural language query and/or context discerned from the text. In some cases, the chatbot determines from the natural language query a wildcard parameter for a database query.

At block 307, the chatbot queries the vulnerability database with the determined parameters. The chatbot can query the vulnerability database by submitting a request to the database via an API of the database, with the parameter(s) of the query provided with the API invocation. As an example, for an external vulnerability database such as the NVD, the chatbot submits a request to the NVD that includes the request parameter(s) via the API of the NVD. Formats of API requests for the vulnerability database have been previously determined and configured for the chatbot.

At block 309, the chatbot obtains query results comprising vulnerability data and/or metadata that satisfy the query (if any). Operations continue at block 317 of FIG. 3B.

At block 311, the chatbot generates a database query corresponding to the natural language query using the tuned generative model. The chatbot provides the natural language query to the generative model that has been adapted for query generation (e.g., via an API of the adapted instance of the generative model) and obtains the database query that the generative model produces.

At block 313, the chatbot queries the IoT security database with the generated database query. The chatbot can connect to the IoT security database for submission of the query via a database connector, such as a database connector made available by a cloud provider of a cloud in which the IoT security database is hosted.

At block 315, the chatbot obtains query results comprising IoT device data and/or metadata that satisfy the query. Results of the database query may be returned to the chatbot in tabular form, where each row corresponds to a result (e.g., an IoT device) and each column corresponds to a database field corresponding to the result. Operations continue at block 317 of FIG. 3B.

At block 317, the chatbot determines if sensitive tenant information is included in the results. The chatbot may have been preconfigured with indications of database fields that store sensitive tenant information based on which it determines if the results include any of this sensitive information. If sensitive tenant information is included in the results, operations continue at block 319. If not, or if masking is to be applied via an open-source library, operations continue at block 321.

At block 319, the chatbot masks the sensitive tenant information in the results. The chatbot can mask or otherwise obfuscate the sensitive tenant information by replacing the data corresponding to sensitive database fields with a placeholder and storing associations between the placeholders and the replaced data.

At block 321, the chatbot generates a summary of the query results. The chatbot can generate the summary by providing the query results (with masking applied, if any) and an instruction to summarize the query results to an LLM. The LLM can be an off-the-shelf LLM that is capable of summarizing input with zero-shot prompting.

Embodiments can leverage an off-the-shelf tool for identifying and masking any sensitive data in query results (e.g., an open-source library that can be installed and leveraged via an API or command line interface (CLI)). In such cases, blocks 317 and 319 can be omitted from the example operations. To provide for identification and masking of sensitive tenant information as made available by the off-the-shelf tool, the chatbot passes the query results and instruction to summarize the results with a flag, parameter value, or other indicator recognized by the tool to indicate that the results should be masked before the tool passes the results to the LLM.

At block 323, the chatbot provides the summary and the query results as a response to the natural language query. Providing the summary and the query results can include displaying the summary and query results on the user interface via which the user interacts with the chatbot. The visualization of the query results that the chatbot provides may be formatted in a table or chart, with text, provided in a downloadable file, or a combination thereof.

At block 325, the chatbot writes the query and the response to conversation history. The chatbot has been configured to maintain conversation history so that the chatbot is stateful. Parameters of the conversation history, such as the window size and/or maximum token count, can be set to a default by the chatbot and/or can be selected by tenants (e.g., during chatbot setup/configuration).

At block 327, the chatbot determines if the conversation with the user continues. The conversation is determined to continue if the user inputs another natural language query. The chatbot may monitor for a timeout window having a designated length (e.g., five minutes of inactivity) or other session termination that are treated as the termination of the conversation. If the conversation continues, operations continue at block 301 of FIG. 3A with the input of another user query. If the conversation is over, operations are complete.

While the example operations corresponding to the determination of a response to the natural language query based on querying knowledge sources and obtaining results are depicted sequentially, embodiments may loop operations related to determining the response a finite number of times. For instance, the chatbot may comprise a ReAct LLM agent that loops through the thought/action/observation process until a final answer to the natural language query has been determined. To illustrate, the chatbot can perform the thought/action/observation process as part of performing the example operations depicted at one or more of blocks 305, 307, 309 and/or 311, 313, and 315. If the chatbot does not settle upon a final answer to the natural language query after performing these steps, the chatbot can repeat these example operations and the thought/action/observation process until it determines the user's query has been answered.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 4:
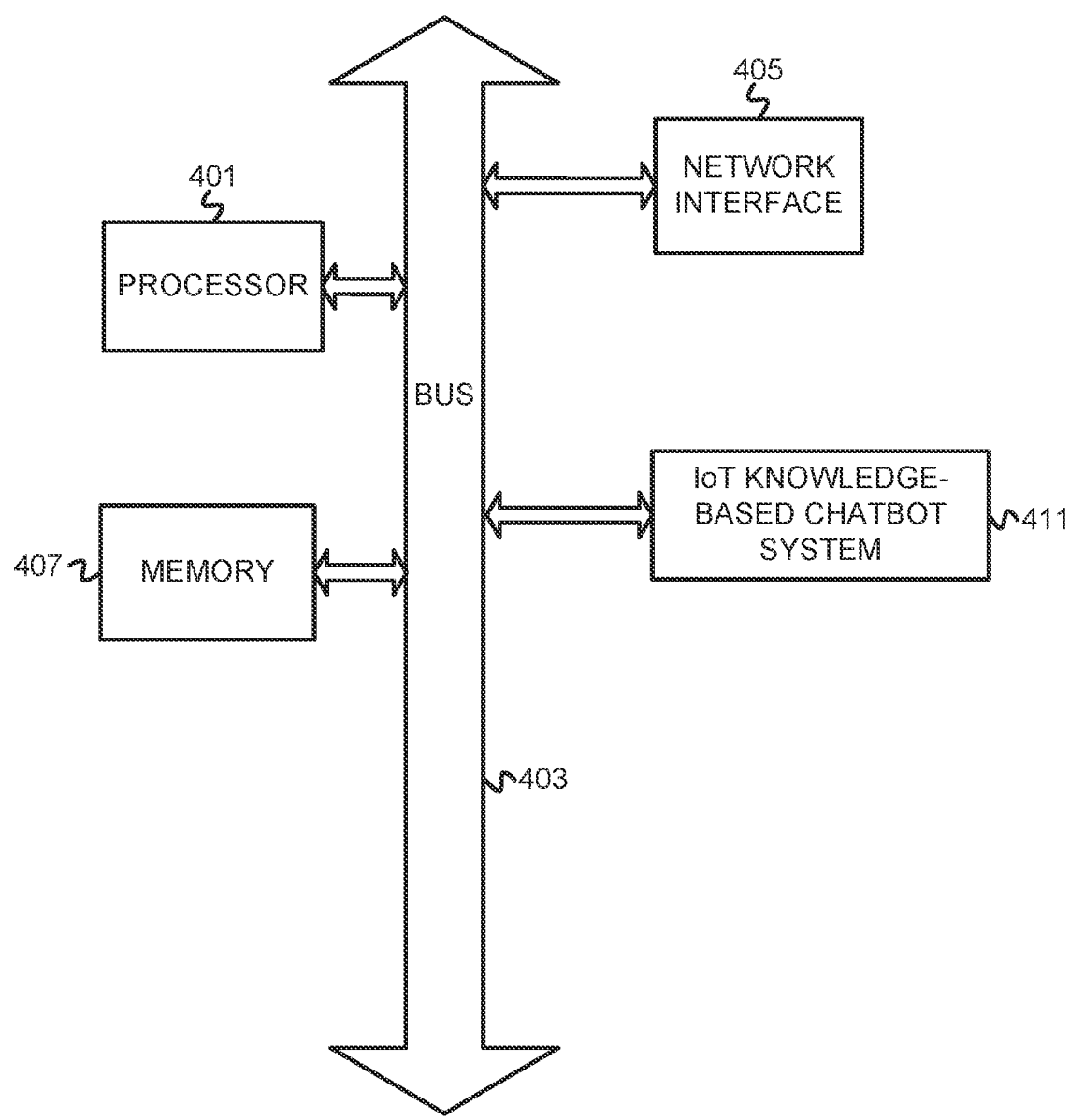
FIG. 4 depicts an example computer system with an IoT knowledge-based chatbot system.

FIG. 4 depicts an example computer system with an IoT knowledge-based chatbot system. The computer system includes a processor 401 (possibly including multiple processors, multiple cores, multiple nodes, and/or implementing multi-threading, etc.). The computer system includes memory 407. The memory 407 may be system memory or any one or more of the above already described possible realizations of machine-readable media. The computer system also includes a bus 403 and a network interface 405. The system also includes IoT knowledge-based chatbot system 411. The IoT knowledge-based chatbot system 411 implements a stateful chatbot that leverages generative AI to process and respond to user queries comprising natural language that can correspond to a variety of knowledge bases, including an IT security database and a vulnerability database(s). Any one of the previously described functionalities may be partially (or entirely) implemented in hardware and/or on the processor 401. For example, the functionality may be implemented with an application specific integrated circuit, in logic implemented in the processor 401, in a co-processor on a peripheral device or card, etc. Further, realizations may include fewer or additional components not illustrated in FIG. 4 (e.g., video cards, audio cards, additional network interfaces, peripheral devices, etc.). The processor 401 and the network interface 405 are coupled to the bus 403. Although illustrated as being coupled to the bus 403, the memory 407 may be coupled to the processor 401.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
    receiving, from input originating from a user, a first query comprising natural language text, wherein the user is associated with a first tenant of one or more tenants of a security provider;

determining if the first query corresponds to at least one of a vulnerability database and a database managed by the security provider that maintains Internet of things (IoT) information for the one or more tenants;

based on determining that the first query corresponds to the database of IoT information, prompting a large language model (LLM) to generate a database query representing the first query that is compatible with the database of IoT information, wherein prompting the LLM to generate the database query comprises generating a prompt comprising an instruction to generate a database query representation of the first query based, at least in part, on a schema of the database of IoT information and providing the prompt to the LLM, wherein an output of the LLM indicates the database query representing the first query; and submitting the database query to the database of IoT information to obtain a first query result comprising at least one of data and metadata maintained in the database that satisfy the database query;

based on determining that the first query corresponds to the vulnerability database, querying the vulnerability database with a vulnerability database query determined based on the first query to obtain a second query result, wherein the second query result comprises at least one of data and metadata maintained in the vulnerability database that satisfy the vulnerability database query;

masking sensitive information of the first tenant that is included in the first query result or the second query result;

generating a summary of the first query result or the second query result having sensitive information masked; and providing the first or second query result and the summary of the first or second query result as a response to the first query.

2. The method of claim 1 further comprising adapting the LLM to generate responses comprising database representations of user queries indicated in prompts, wherein adapting the LLM comprises, generating pairs of user queries and corresponding database queries that comport to the schema of the database of IoT information, wherein the user queries comprise natural language;

adding the pairs of user queries and corresponding database queries to a set of inputs; and providing the set of inputs to the LLM.

3. The method of claim 1, wherein the LLM comprises a pre-trained transformer-based LLM.

4. The method of claim 1 further comprising determining one or more parameters for the vulnerability database query based on the first query, wherein determining that the first query corresponds to the vulnerability database comprises determining that the first query relates to a known vulnerability, wherein the vulnerability database comprises at least one of an external vulnerability database and an internal vulnerability database.

5. The method of claim 4, wherein the external vulnerability database comprises the National Vulnerability Database (NVD), wherein querying the vulnerability database comprises querying the NVD via an application programming interface (API) of the NVD.

6. The method of claim 1 further comprising recording the first query and the first or second query result to conversational memory.

7. The method of claim 1, wherein generating the summary of the first or second query result comprises providing the first or second query result to an additional LLM with an instruction to summarize the first or second query result, and wherein masking the sensitive information of the first tenant comprises masking the sensitive information before providing the first or second query result to the additional LLM.

8. The method of claim 1, wherein generating the database query comprises generating a Structured Query Language (SQL) query representing the first query that is compatible with the database of IoT information.

9. The method of claim 1, wherein masking sensitive information of the first tenant that is included in the first query result or the second query result comprises, for each sensitive database field identified in the first query result or the second query result, replacing data corresponding to the sensitive database field with a placeholder and storing an association between the data and the placeholder.

10. One or more non-transitory machine-readable media having program code for implementing a chatbot that interfaces with an Internet of things (IoT) information system stored thereon, the program code comprising instructions to:

obtain a first query from user input to the chatbot, wherein the first query comprises natural language text and corresponds to a first tenant of one or more tenants of a security provider;

determine whether the first query corresponds to at least one of a database of Internet of things (IoT) information and a vulnerability database, wherein the chatbot interfaces with the database of IoT information and the vulnerability database;

wherein the database of IoT information is managed by the security provider and maintains at least one of data and metadata of IoT devices of the one or more tenants;

based on a determination that the first query corresponds to the database of IoT information, prompt a large language model (LLM) to generate a database query representing the first query that is compatible with the database of IoT information, wherein the instructions to prompt the LLM to generate the database query comprise instructions to generate a prompt comprising an instruction to generate a database query representative of the first query based, at least in part, on a schema of the database of IoT information and provide the prompt to the LLM, wherein an output of the LLM indicates the database query;

query the database of IoT information with the generated database query;

based on a determination that the first query corresponds to the vulnerability database, query the vulnerability database with a vulnerability database query determined based on the first query;

mask sensitive information of the first tenant included in results of at least one of the generated database query and the vulnerability database query;

generate a summary of the results of at least one of the generated database query and the vulnerability database query having sensitive information masked; and present the results and the summary of the results in response to the first query.

11. The non-transitory machine-readable media of claim 10, wherein the LLM comprises a pre-trained transformer-based LLM, and wherein the instructions to prompt the LLM comprise instructions to prompt the pre-trained transformer-based LLM.

12. The non-transitory machine-readable media of claim 11, wherein the program code further comprises instructions to refine the pre-trained transformer-based LLM, wherein the instructions to refine the pre-trained transformer-based LLM comprise instructions to,
   form a plurality of pairs of queries, wherein each of the pairs of queries comprises a natural language query as a prompt and a corresponding database query that comports to the schema of the database of IoT information as an expected response to the prompt; and
   provide the pre-trained transformer-based LLM with the plurality of pairs of queries.

13. The non-transitory machine-readable media of claim 11, wherein the instructions to refine the pre-trained transformer-based LLM comprise instructions to refine the pre-trained transformer-based LLM to generate Structured Query Language (SQL) queries representative of natural language queries indicated in prompts, and wherein the instructions to prompt the LLM to generate the database query comprise instructions to prompt the pre-trained transformer-based LLM to generate a SQL query representing the first query.

14. The non-transitory machine-readable media of claim 10, wherein the chatbot is stateful, and wherein the program code further comprises instructions to record the first query and the results to conversational memory of the chatbot.

15. An apparatus comprising:
   a processor; and
   a machine-readable medium having instructions stored thereon that are executable by the processor to cause the apparatus to,
      obtain a first query submitted by a user via a chatbot interface, wherein the first query comprises natural language, wherein the user is associated with a tenant of a security provider;
      determine if the first query corresponds to at least one of an Internet of things (IoT) database that maintains information about of IoT devices of the tenant and a vulnerability database, wherein the chatbot interface interfaces with the IoT database and the vulnerability database;
      based on a determination that the first query corresponds to the IoT database,
         prompt a large language model (LLM) to generate a database query representative of the first query that is compatible with the IoT database based on generation of a prompt comprising an instruction to generate a database query representative of the first query based, at least in part, on a schema of the IoT database and providing the prompt to the LLM, wherein an output of the LLM indicates the database query; and
         submit the database query to the IoT database;
      based on a determination that the first query corresponds to the vulnerability database, submit to the vulnerability database a vulnerability database query determined from the first query;
      mask sensitive information of the tenant included in one or more results obtained from submission of at least one of the database query and the vulnerability database query;
      generate a summary of the one or more results with sensitive information masked; and
      provide the one or more results and the summary of the one or more results as a response to the first query.

16. The apparatus of claim 15, wherein the instructions executable by the processor to cause the apparatus to prompt the LLM to generate the database query comprise instructions to prompt the LLM to generate a Structured Query Language (SQL) query corresponding to the first query.

17. The apparatus of claim 15 further comprising instructions executable by the processor to cause the apparatus to adapt the LLM to generate responses comprising database query representations of natural language text indicated in prompts based on a plurality of pairs of natural language queries and database queries.

18. The apparatus of claim 17, wherein the instructions executable by the processor to cause the apparatus to adapt the LLM comprise instructions executable by the processor to cause the apparatus to, for each pair of the plurality of pairs that comprises a natural language query and a database query,
   generate the database query based on the natural language query, wherein the database query is compatible with the IoT database;
   create an input comprising the natural language query and the database query; and
   add the input to a set of inputs to be provided to the LLM.

19. The apparatus of claim 15,
   wherein the instructions executable by the processor to cause the apparatus to determine that the first query corresponds to the vulnerability database comprise instructions executable by the processor to cause the apparatus to determine that the first query is a query for vulnerability information,
   wherein the vulnerability database comprises at least one of an external vulnerability database and an internal vulnerability database.

20. The apparatus of claim 15, wherein the instructions executable by the processor to cause the apparatus to generate the summary of the one or more results comprise instructions executable by the processor to cause the apparatus to provide the one or more results with sensitive information masked to an LLM with an instruction to summarize the one or more results.

* * * * *